(12) United States Patent
Doerr

(10) Patent No.: US 8,208,817 B2
(45) Date of Patent: Jun. 26, 2012

(54) HIGH-SPEED OPTICAL MODULATION USING A QUANTUM-WELL MODULATOR

(75) Inventor: Christopher R. Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 479 days.

(21) Appl. No.: 12/407,996

(22) Filed: Mar. 20, 2009

(65) Prior Publication Data
US 2010/0239268 A1 Sep. 23, 2010

(51) Int. Cl.
H04B 10/04 (2006.01)
(52) U.S. Cl. .......................... 398/183; 398/186; 398/187
(58) Field of Classification Search .................. 398/183, 398/186, 187
See application file for complete search history.

(56) References Cited

U.S. PATENT DOCUMENTS

| | | | | |
|---|---|---|---|---|
| 5,515,196 | A * | 5/1996 | Kitajima et al. | 398/185 |
| 5,917,637 | A | 6/1999 | Ishikawa et al. | |
| 2002/0071622 | A1 | 6/2002 | Betts et al. | |
| 2002/0179929 | A1* | 12/2002 | Takahashi et al. | 257/184 |
| 2005/0254743 | A1* | 11/2005 | Akiyama et al. | 385/3 |

OTHER PUBLICATIONS

D. Caprioli, et al., "A 10 Gb/s Traveling Wave Mz-Modulator for Integration with a Laser," in Proc. 11th Eur. Int. Opt. Conf., Prague, Czech Republic, Apr. 2-4, 2003, pp. 145-114.
D.T. Neilson, et al., "EAM-Based InP MZ Modulator for 40-Gb/s PSBT Using 20-Gb/s Tributaries," ECOC 2008, Sep. 21-25, 2008, Brussels, Belgium, pp. 1-2.
R. A. Griffin, et al., "Performance of MQW InP Mach-Zehnder Modulators for Advanced ModuBation Formats," OFC 2005 Technical Digest, Mar. 2005, Talk OTuL5, vol. 2, p. 3.
Fumio Koyama, et al., "Frequency Chirping in External Modulators," Journal of Lightwave Technology, Jan. 1988, vol. 6, No. 1, pp. 87-93.
Anat Shen and Christopher R. Doerr, "InP-Based Photonic Circuits and Components," Integrated optical Circuits and Components, by Edmond J. Murphy, CRC Press, 1999, Chapter 7, pp. 172-183.
International Search Report and Written Opinion for PCT/US2010/027562 mailed on Oct. 15, 2010.

* cited by examiner

*Primary Examiner* — Kinam Park
(74) *Attorney, Agent, or Firm* — Mendelsohn, Drucker & Associates, P.C.; Yuri Gruzdkov; Steve Mendelsohn

(57) ABSTRACT

An optical transmitter having a quantum-well (QW) modulator and a method of operating the same. The QW modulator is configurable to perform both amplitude and phase modulation. Using the disclosed methods, the length of the QW modulator, one or more drive voltages, and/or an operating wavelength can be selected to enable the optical transmitter to generate a modulated optical signal having a relatively high bit rate, e.g., an optical duobinary signal having a bit rate greater than about 80 Gb/s.

24 Claims, 5 Drawing Sheets

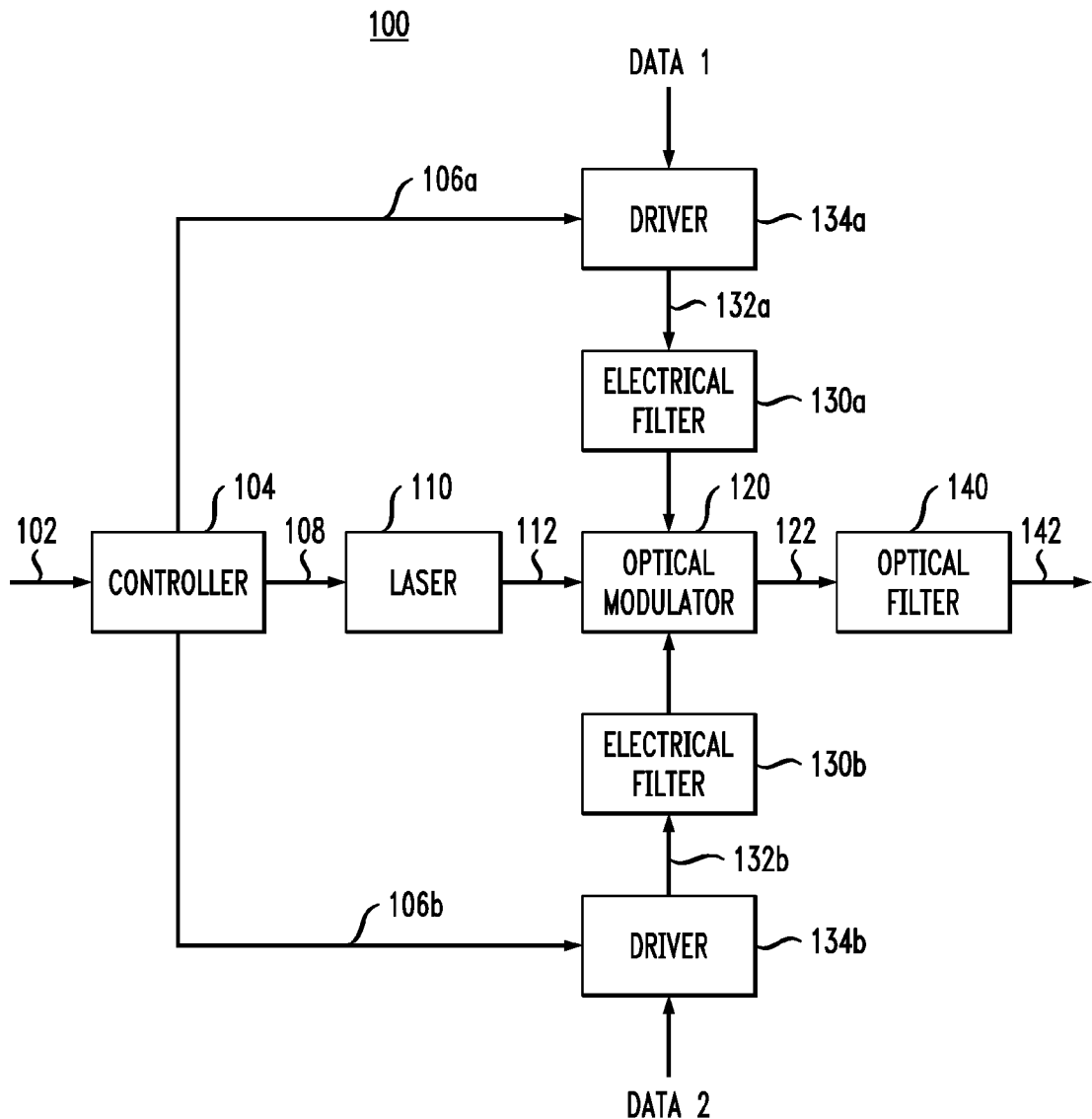

ACTIVE

PASSIVE

HIGH-SPEED OPTICAL MODULATION USING A QUANTUM-WELL MODULATOR

BACKGROUND

1. Field of the Invention

The present invention relates to optical communication equipment and, more particularly but not exclusively, to optical modulators.

2. Description of the Related Art

This section introduces aspects that may help facilitate a better understanding of the invention(s). Accordingly, the statements of this section are to be read in this light and are not to be understood as admissions about what is in the prior art or what is not in the prior art.

An optical modulator is a key enabling element of an optical communication system. To meet the ever-increasing demand for data-throughput capacity, modern optical modulators are expected to support a relatively high (e.g., >10 Gb/s) data rate while having several other desirable characteristics, such as relatively small size, energy consumption, and cost of the constituent electro-optic components. For example, optical modulators capable of operating at about 100 Gb/s are being actively developed.

SUMMARY

Disclosed are an optical transmitter having a quantum-well (QW) modulator and a method of operating the same. In some embodiments, the QW modulator may be configured to perform both amplitude and phase modulation. In some embodiments, the length of the QW modulator, one or more drive voltages, and/or an operating wavelength can be selected to enable the optical transmitter to generate a modulated optical signal having a relatively high bit rate, e.g., an optical duobinary signal having a bit rate greater than about 80 Gb/s.

According to one embodiment, provided is an optical transmitter having a Mach-Zehnder (MZ) interferometer having first and second interferometer arms. The first interferometer arm comprises a first QW modulator. The second interferometer arm comprises a second QW modulator. The optical transmitter further has a first driver circuit electrically coupled to drive the first QW modulator, and a second driver circuit electrically coupled to drive the second QW modulator. A laser optically coupled to the MZ interferometer applies thereto an optical input signal having an operating wavelength. The optical transmitter further has a controller that configures: (i) the first driver circuit to generate first and second drive voltages for the first QW modulator; (ii) the second driver circuit to generate the first and second drive voltages for the second QW modulator; and (iii) the laser to generate the operating wavelength. The first drive voltage corresponds to a first binary level. The second drive voltage corresponds to a second binary level. The controller operates to configure the first and second driver circuits and the laser to cause a ratio $\delta$ of a peak-to-peak change in electro-refraction to a peak-to-peak change in electro-absorption corresponding to the first and second drive voltages to be greater than zero but smaller than about two.

According to another embodiment, provided is a method of operating an optical transmitter having the step of generating first and second drive voltages for a first QW modulator to produce an optical signal modulated with data. The optical transmitter comprises the first QW modulator. The first drive voltage corresponds to a first binary level. The second drive voltage corresponds to a second binary level. The method further has the step of generating an input optical signal having an operating wavelength for the optical transmitter so that, for the first QW modulator, a ratio $\delta$ of a peak-to-peak change in electro-refraction to a peak-to-peak change in electro-absorption corresponding to the first and second drive voltages is greater than zero but smaller than about two.

According to another embodiment, provided is an optical transmitter having a first QW modulator and means for generating first and second drive voltages for the first QW modulator to produce an optical signal modulated with data. The first drive voltage corresponds to a first binary level. The second drive voltage corresponds to a second binary level. The optical transmitter further has means for generating an input optical signal having an operating wavelength for the optical transmitter so that, for the first QW modulator, a ratio $\delta$ of a peak-to-peak change in electro-refraction to a peak-to-peak change in electro-absorption corresponding to the first and second drive voltages is greater than zero but smaller than about two.

BRIEF DESCRIPTION OF THE DRAWINGS

Other aspects, features, and benefits of the present invention will become more fully apparent from the following detailed description, the appended claims, and the accompanying drawings in which:

FIG. 1 shows an optical transmitter according to some embodiments of the invention;

DETAILED DESCRIPTION

Figure 2A:
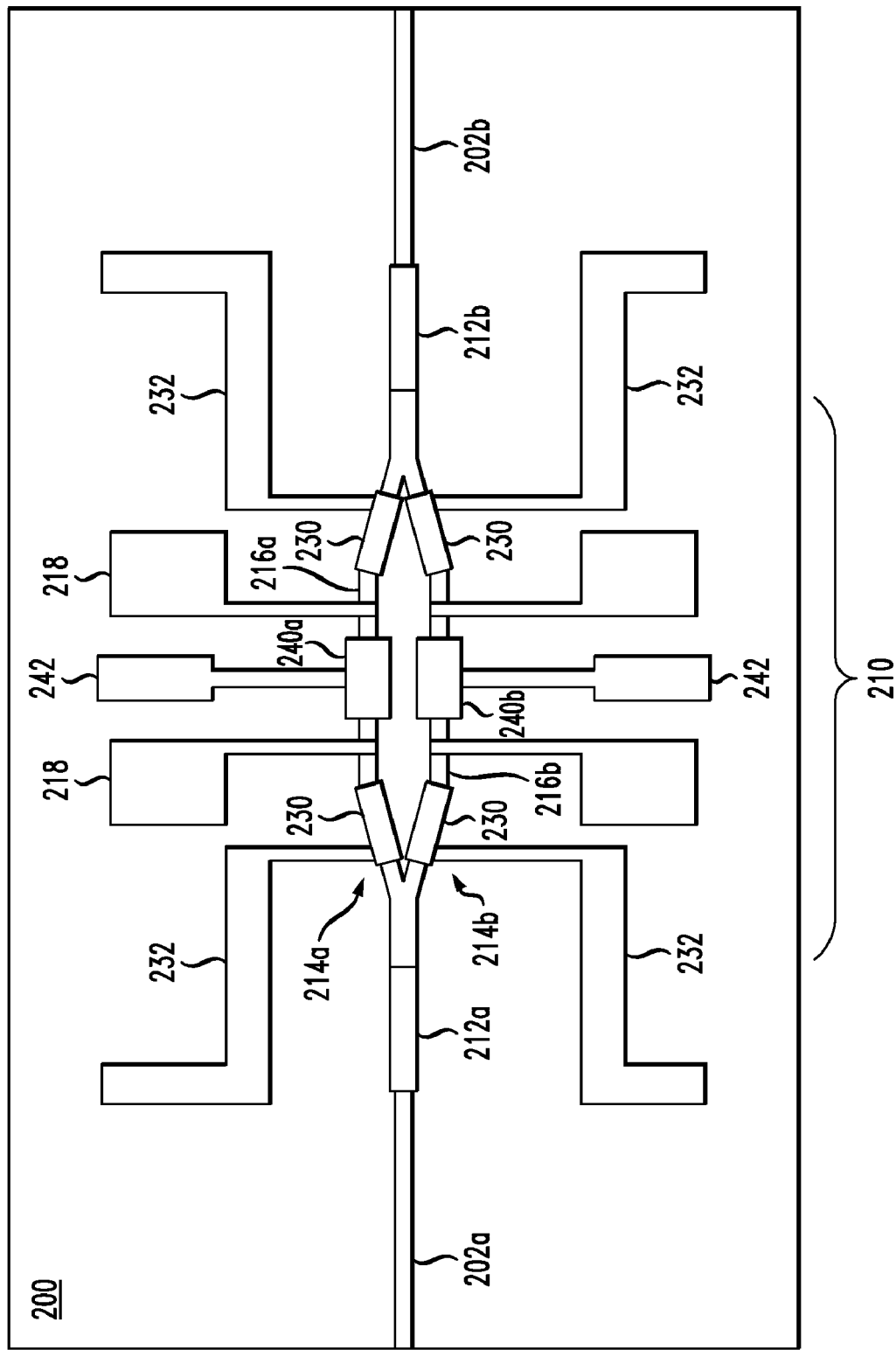
FIGS. 2A-C show different views of an optical modulator that can be used in the optical transmitter of FIG. 1 according to some embodiments of the invention.

FIG. 1 shows an optical transmitter 100 according to some embodiments of the invention. Transmitter 100 has a laser 110 that feeds an optical modulator 120 with an input signal 112. Modulator 120 modulates optical signal 112 based on electrical data signals Data1 and Data2 to produce a modulated optical signal 122. Modulator 120 can advantageously support a relatively high (e.g., >80 Gb/s) data rate due to the characteristics described in more detail below. In one configuration, Data1=$\overline{\text{Data2}}$, where the bar denotes data inversion. As known in the art, the data inversion operation transforms (i) a binary one into a binary zero and (ii) a binary zero into a binary one.

The wavelength of signal 112 is controlled by a controller 104 via a control signal 108 applied to laser 110. Controller 104 also controls, via control signals 106a-b, the voltages of drive signals 132a-b applied by driver circuits 134a-b, respectively, to filters 130a-b or, in the absence of those filters, directly to optical modulator 120. Controller 104 generates control signals 106a-b and 108 based on a configuration signal 102 received form a master controller (not explicitly shown) of the optical communication system, in which transmitter 100 is deployed.

Transmitter 100 might optionally have electrical low-pass filters 130a-b and/or an optical bandpass filter 140. Assuming that data signals Data1 and Data2 have the same bit rate, a first representative embodiment is one in which transmitter 100 has electrical low-pass filters 130a-b but does not have optical bandpass filter 140, wherein each of filters 130a-b has a bandwidth corresponding to about one quarter of the bit rate.

For example, to produce this embodiment, modulator 120 can be packaged so that the electrical leads/connections of the package between driver circuits 134a-b and optical modulator 120 and/or the capacitance of the modulator provide the filtering that is functionally equivalent to having lumped electrical low-pass filters 130a-b. A second representative embodiment is one in which transmitter 100 has optical band-pass filter 140 but does not have electrical low-pass filters 130a-b, wherein filter 140 has a bandwidth corresponding to about one half of the bit rate. If, in the absence of filters 130a-b and 140, modulated optical signal 122 is a binary phase-shift keying (BPSK) signal, then, in the presence of filters 130a-b and/or filter 140, an optical output signal 142 generated by transmitter 100 is an optical duobinary signal. Thus, transmitter 100 can advantageously operate as an optical duobinary transmitter.

Figure 2B:
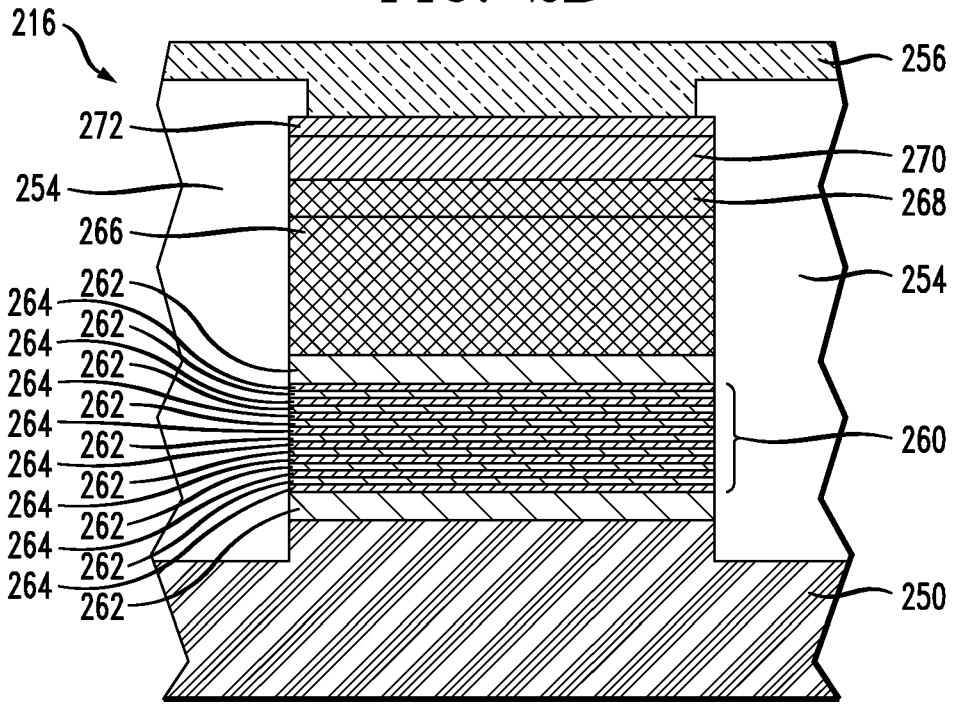
Figure 2C:
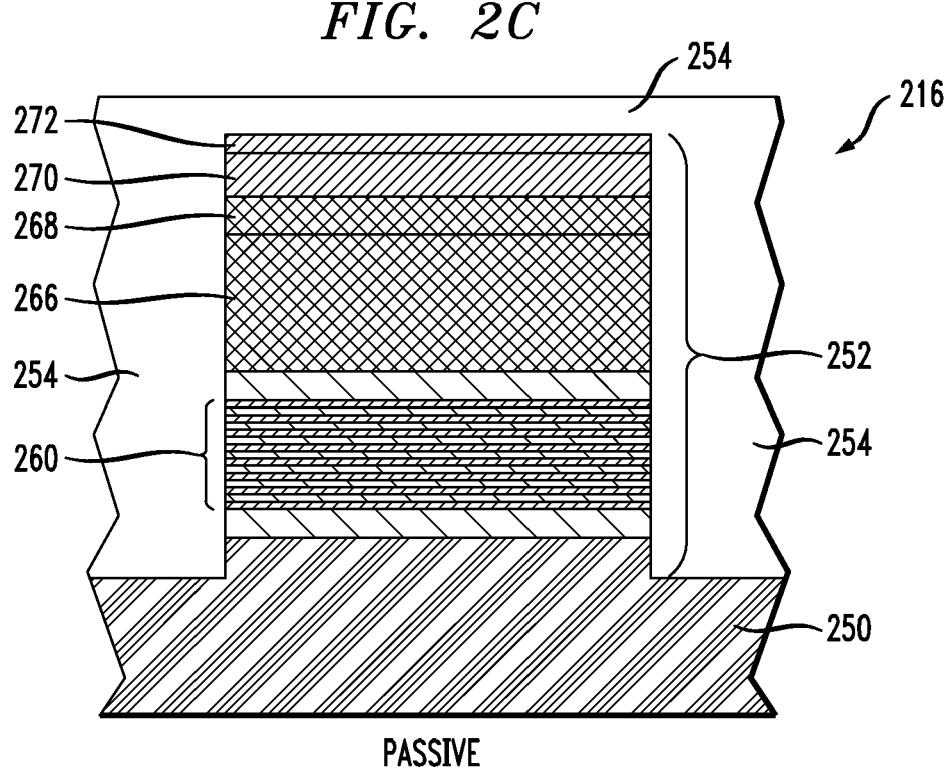

FIGS. 2A-C show an optical modulator 200 that can be used as modulator 120 according to one embodiment of the invention. More specifically, FIG. 2A shows a top view of modulator 200. FIGS. 2B-C show exemplary cross-sectional views of a waveguide 216 used in modulator 200, with the two cross-sections corresponding to the waveguide's active and passive portions, respectively.

Referring to FIG. 2A, modulator 200 has a Mach-Zehnder (MZ) interferometer 210 coupled between waveguides 202a-b. MZ interferometer 210 has interferometer arms 214a-b, which are coupled to waveguides 202a-b via two 1×2 multi-mode-interference (MMI) couplers 212a-b. Each interferometer arm 214 comprises a corresponding waveguide 216. A portion of waveguide 216 that is capped by a metal electrode is referred to as an active portion (see also FIG. 2B). A portion of waveguide 216 that is capped by a dielectric cladding and does not have a metal electrode over it is referred to as a passive portion (see also FIG. 2C). For example, one active portion of waveguide 216 is located within a phase shifter 230. Another active portion of waveguide 216 is located within a quantum-well (QW) modulator 240. A passive portion of waveguide 216 is located between a phase shifter 230 and QW modulator 240 coupled to that phase shifter.

In the embodiment shown in FIG. 2A, each interferometer arm 214 has (i) a corresponding one of QW modulators 240a-b and (ii) two phase shifters 230. In alternative embodiments, up to three phase shifters 230 can be removed from modulator 200 as long as the remaining one or more phase shifters 230 enable MZ interferometer 210 to be configured so that, with QW modulators 240a-b unbiased, interferometer arms 214a-b produce a desired phase difference. For example, said desired phase difference can be about 180 degrees. In yet another embodiment, all phase shifters 230 can be removed as long as the optical path corresponding to interferometer arm 214a is one half a wavelength longer or shorter than the optical path corresponding to interferometer arm 214b, thereby producing a phase difference of about 180 degrees. In general, MZ interferometer 210 will perform satisfactorily when the phase difference is between about 165 and about 195 degrees.

Modulator 200 has a plurality of conducting tracks 218, 232, and 242. Conducting tracks 218 can be used, e.g., to apply a ground potential to the cores of the passive portions of waveguides 216. Conducting tracks 218 also contact the conducting substrate (e.g., a base 250) to provide a ground potential for the n side of modulator 200. Conducting tracks 232 can be used to apply desired bias voltages to respective phase shifters 230. Conducting tracks 242 are used to apply drive signals to the p side of QW modulators 240.

Referring to FIGS. 2B-C, waveguide 216 is, e.g., a ridge waveguide having a generally rectangular ridge 252 supported on base 250. A cladding 254 surrounds ridge 252 (i) on two sides in an active portion of waveguide 216 (e.g., the left and right sides in FIG. 2B) and (ii) on three sides in a passive portion of the waveguide (e.g., the left, right, and top sides in FIG. 2C). An electrode 256 covers the top side of ridge 252 in the active portion.

Ridge 252 comprises a core 260 having a multilayered structure that contains a multiple quantum well (MQW) that comprises N quantum-well (QW) layers 262 and N+1 barrier layers 264 interleaved therewith. In addition to core 260, ridge 252 has an upper cladding layer 266, buffer layers 268 and 270, and a cap layer 272. In a representative embodiment, the following materials can be used to fabricate the structures shown in FIGS. 2B-C: (i) n-doped InP for base 250; (ii) two different alloys of InGaAsP for QW layers 262 and barrier layers 264, respectively; (iii) undoped InP for upper cladding layer 266; (iv) p-doped InP for buffer layer 268; (v) $p^+$-doped InP for buffer layer 270; (vi) $p^+$-doped InGaAs for cap layer 272; (vii) gold and/or titanium for electrode 256; and (viii) benzocyclobutene for cladding 254. In the embodiment shown in FIGS. 2B-C, N=8. In an alternative embodiment, a different value of N can similarly be used.

In operation, modulator 200 relies on a quantum-confined Stark effect. In general, a Stark effect is a phenomenon that involves shifting and/or splitting of energy levels due to the presence of an external static or quasi-static electric field. In a semiconductor structure (such as the MQW in core 260), where a thin layer of a smaller-bandgap material is sandwiched between two layers of a larger-bandgap material, the Stark effect can be dramatically enhanced and is referred to as the quantum-confined Stark effect.

Due to the Stark effect, index of refraction n of a semiconductor material depends on both frequency ω (or wavelength λ) of the propagating optical wave and external electric field E, as expressed by Eq. (1):

$$n(\omega, E) = n_1(\omega, E) + ik(\omega, E) \tag{1}$$

where $n_1$ and k are the real and imaginary parts, respectively, of the index of refraction. For a given frequency $\omega = \omega_0$, the Stark effect can be quantified by the values of $\Delta n_1$ and $\Delta k$, which are defined by Eqs. (2)-(3), respectively:

$$\Delta n_1(\omega_0, E) = n_1(\omega_0, E) - n_1(\omega_0, 0) \tag{2}$$

$$\Delta k(\omega_0, E) = k(\omega_0, E) - k(\omega_0, 0) \tag{3}$$

The value of $\Delta n_1$ quantifies electro-refraction, which is generally responsible for phase modulation in a corresponding QW modulator, such as QW modulator 240. The value of $\Delta k$ quantifies electro-absorption, which is generally responsible for amplitude modulation in the QW modulator.

Figure 3:
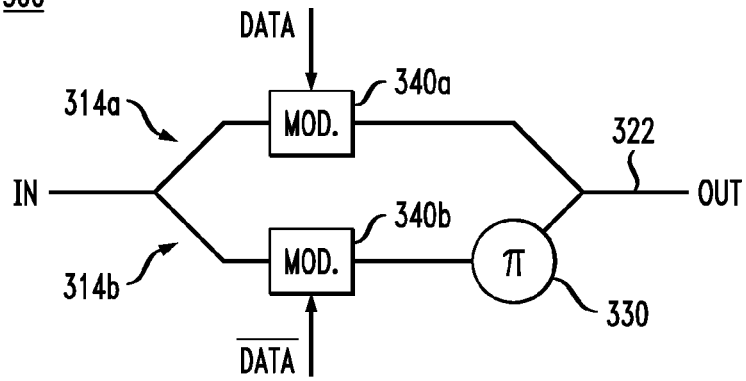
FIG. 3 shows a schematic diagram of a model optical circuit corresponding to the modulator of FIG. 2.

FIG. 3 shows a schematic diagram of a model optical circuit 300 corresponding to modulator 200 (FIG. 2). Circuit 300 is a Mach-Zehnder (MZ) interferometer having two interferometer arms 314a-b. Interferometer arm 314a has an optical modulator 340a corresponding to modulator 240a of FIG. 2. Interferometer arm 314b has (i) an optical modulator 340b corresponding to modulator 240b of FIG. 2 and (ii) an about 180-degree phase shift 330 that represents a combined effect of four correspondingly configured phase shifters 230 of FIG. 2 or the optical path difference of about one half a wavelength between interferometer arms 214a-b for the embodiment not having phase shifters 230. Modulators 340a-b are driven by drive signals (e.g., drive signals 132a-b of FIG. 1) corresponding to data signals Data and $\overline{\text{Data}}$, respectively.

An optical output signal 322 produced by circuit 300 is an approximately chirp-free BPSK signal when both modulators 340a-b are either pure phase modulators or pure amplitude modulators. For example, if each of modulators 340a-b is a pure phase modulator configured to apply (i) a phase shift of about 180 degrees when the drive signal is a binary "one" and (ii) a phase shift of about 0 degrees when the drive signal is a binary "zero," then output signal 322 has a constant intensity but changes the phase by 180 degrees when the drive signal switches from one binary state to the other. The phase of output signal 322 remains constant within the bit period (hence, no chirp) and changes only when the output is zero. A similar result is obtained if each of modulators 340a-b is a pure amplitude modulator configured to transmit (i) 100% of light when the drive signal is a binary "one" and (ii) no light when the drive signal is a binary "zero." Due to the ON/OFF operation of modulators 340a-b in the amplitude-modulation variant of circuit 300, the amplitude-modulation variant has a 6-dB higher insertion loss than the phase-modulation variant.

It is generally advantageous to have a modulator that (i) produces low chirp or no chirp at all and (ii) has a relatively small insertion loss. Having low chirp is important because chirp causes line broadening and adversely affects the effective transmission bandwidth of the optical communication system. In addition, low chirp helps to reduce the adverse effects of chromatic dispersion in the fiber-transmission link. Having a relatively small insertion loss is important because it lowers optical power requirements to the optical feed sources, such as laser 110 of FIG. 1.

In some prior-art systems, the low chirp/low insertion loss characteristics are typically achieved by operating the modulator at a wavelength that is detuned by a very large amount from the wavelength corresponding to the bandgap of the semiconductor material used in the modulator. These design and operating constraints cause the corresponding modulator to substantially operate as a pure phase modulator. For example, lithium-niobate modulators, which are widely used in optical communication systems, produce substantially pure phase modulation because (i) lithium niobate has a bandgap of about 4 eV (~310 nm) and (ii) the operating wavelengths are usually selected from a range between about 1400 nm and about 1600 nm, which is far detuned from 310 nm corresponding to the bandgap of lithium niobate. In addition, lithium niobate modulators rely on the Pockels effect rather than the quantum-confined Stark effect. Since the is Pockels effect is very weak, lithium niobate modulators are much longer (e.g., about 500 times longer) than InP modulators.

As already indicated above, if modulators 340a-b are pure phase modulators, then, to implement the above-described BPSK modulation, each of them needs to produce a peak-to-peak phase shift of about 180 degrees. As used in this specification, the term "peak-to-peak" designates a change in the corresponding parameter (in this case, the phase shift) that is produced by changing the drive voltage of the modulator (e.g., modulator 240 or 340) from the voltage corresponding to a binary "zero" to the voltage corresponding to a binary "one." The requirement of having the capacity to produce a 180-degree peak-to-peak phase shift imposes a lower bound on the total length (i.e., the dimension in the wave-propagation direction) of the modulator. More specifically, if the swing of the drive signals (e.g., drive signals 132a-b, see FIG. 1) is limited to a particular practically feasible value (e.g., about 5 V), then the maximum peak-to-peak phase shift that can be acquired by the optical wave per unit length of the modulator is correspondingly limited. Hence, the modulator needs to have at least a certain minimum length to enable the optical wave to acquire the desired 180-degree phase shift.

The relatively large size of pure-phase modulators presents an obstacle to increasing the data rate. More specifically, the RC response of a relatively large modulator is inherently slow, which makes the modulator unfit for relatively high (e.g., >10 Gb/s) bit rates. Some prior-art approaches to solving this problem lead to rather complicated designs, such as a traveling-wave design. However, the footprint of a traveling-wave modulator remains disadvantageously large.

Through experimentation and simulation, we discovered that modulator 200 can be implemented to have a relatively small footprint and, at the same time, be capable of operating at relatively high bit rates. For example, each of QW modulators 240a-b can have a total length smaller than about 500 µm or even smaller than about 300 µm, or have any total length from a range between about 100 µm and about 200 µm. In one embodiment, the total length of QW modulators 240 is such that, for an optical wave having the operating wavelength, transit time through the QW modulator is smaller than about 20% of the inverse of the bit rate (note that the inverse bit rate is proportional or equal to a bit period). The resulting implementations of modulator 200 can advantageously be configured to exhibit relatively low chirp and relatively low insertion loss while operating at data rates greater than about 50 Gb/s or even greater than about 80 Gb/s.

Figure 4A:
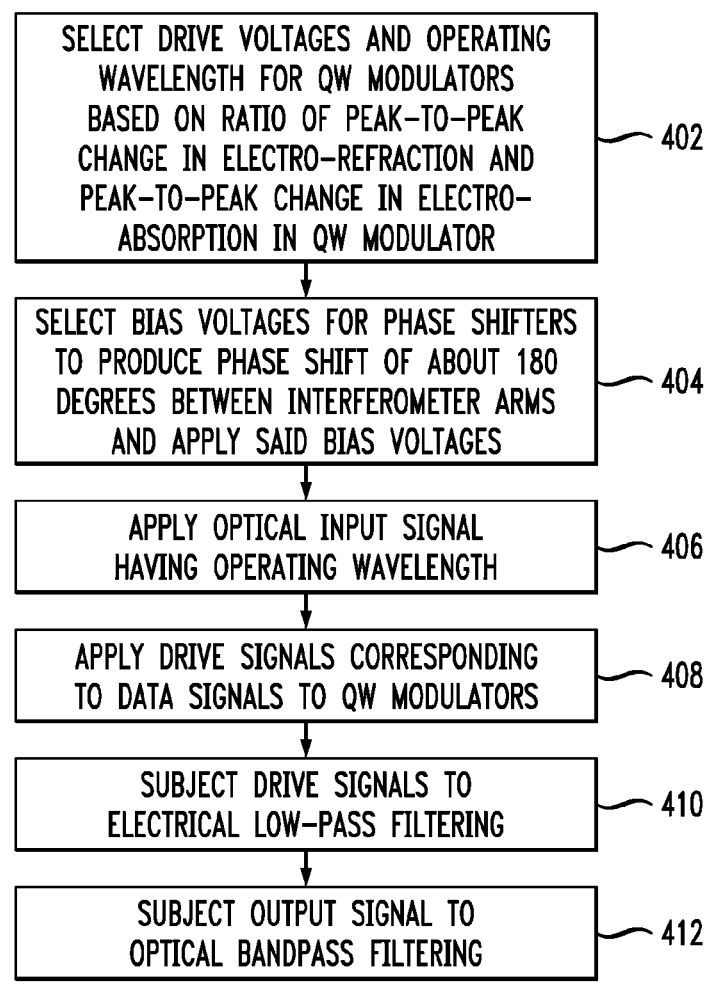
FIGS. 4A-B illustrate a method of operating the optical transmitter of FIG. 1 according to some embodiments of the invention.
Figure 4B:
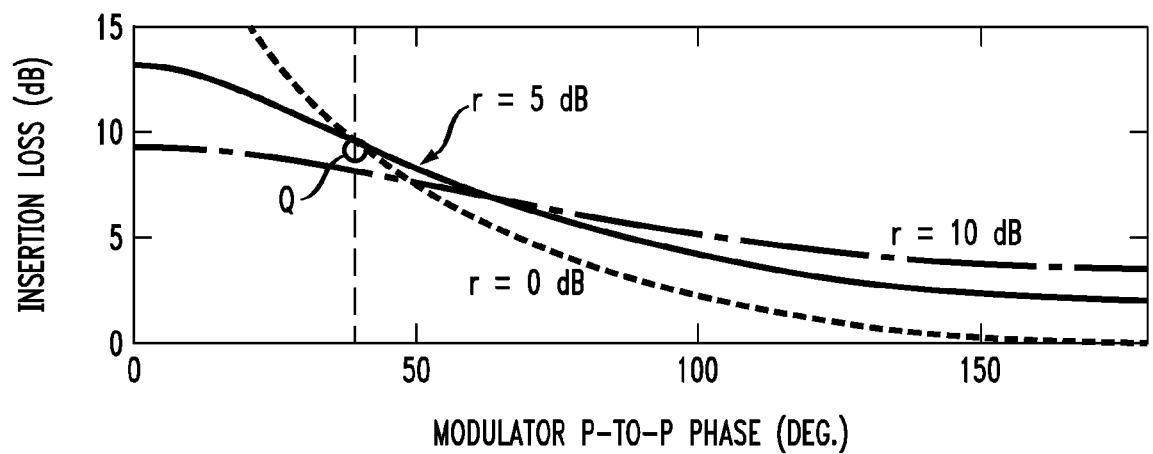

FIGS. 4A-B illustrate a method 400 of operating optical transmitter 100 according to one embodiment of the invention. More specifically, FIG. 4A shows a flowchart of method 400. FIG. 4B graphically illustrates a representative configuration of transmitter 100 that is produced using method 400. Although for illustration purposes, method 400 is described in reference to transmitter 100 having modulator 200, one skilled in the art will understand that the method can similarly be used to operate other optical transmitters.

At step 402 of method 400, the operating wavelength and drive voltages corresponding to the binary "zero" and "one" are selected for QW modulators 240a-b as further explained below.

The drive voltages that can be selected at step 402 are typically restricted to the voltage range of the corresponding drive circuits (e.g., drive circuits 134a-b of FIG. 1) used with modulator 200. For example, the drive circuit might be able to generate drive voltages from a voltage range between about 0 V and about −6 V. Since the geometry of QW modulator 240 is known, the electric fields induced by the selected voltages in MQ well 260 can unambiguously be determined. Hereafter, we denote the electric fields corresponding to binary "zero" and "one" as $E_0$ and $E_1$, respectively. In one possible configuration, one of $E_0$ and $E_1$ can be zero.

Similarly, operating wavelength λ that can be selected at step 402 for laser 110 is usually restricted by the specifications/requirements/configuration of the optical communication system in which transmitter 100 operates. In general, configuration signal 102 received by controller 104 from the master controller of the optical communication system specifies one or more acceptable discrete wavelengths or a range of acceptable wavelengths for transmitter 100. Accordingly, controller 104 configures laser 110 based on the instructions received from the master controller.

Using the information about the voltage range of the drive circuits and the instructions from the master controller, controller 104 selects operating wavelength λ and the drive voltages corresponding to the binary "zero" and "one" based on parameter A, which is defined approximately by Eq. (4):

$$\delta(\omega) = \left| \frac{\Delta n_1(\omega, E_1) - \Delta n_1(\omega, E_0)}{\Delta k(\omega, E_1) - \Delta k(\omega, E_0)} \right| \quad (4)$$

where $\Delta n_1$ and $\Delta k$ are defined by Eqs. (2)-(3), respectively, and $\lambda = 2\pi l\omega$, where c is the speed of light in vacuum. As can be seen, parameter $\delta$ contains a ratio of the peak-to-peak change in electro-refraction and the peak-to-peak change in electro-absorption in QW modulator 240. Operating wavelength $\lambda$ and the drive voltages are selected so that $\delta$ falls into a specified range. For example, in one implementation, the specified range is a range of positive values between about 0 and about 2. In another implementation, the specified range is a range between about 0.1 and about 1.9. In yet another implementation, the specified range is a range between about 0.5 and about 1.5.

It might also be desirable that both $\Delta n_1(\omega, E_1)$ and $\Delta n_1(\omega, E_0)$ are not negative. Note however that, if $\Delta n_1(\omega, E_1) \geq 0$, then it is generally true that $\Delta n_1(\omega, E_0) \geq 0$. The above-specified ranges for parameter $\delta$ imply that, at the operating wavelength, QW modulator 240 performs both amplitude and phase modulation. Due to the relatively small length of QW modulator 240, with the drive voltages and operating wavelength selected based on parameter $\delta$, the peak-to-peak phase shift in the QW modulator is usually smaller than about 180 degrees or even smaller than about 90 degrees.

FIG. 4B shows that chirp parameter C is a function of the peak-to-peak phase shift and extinction ratio r in QW modulator 240. Since all these quantities are functions of $\lambda$, $E_0$, and $E_1$, FIG. 4B can be used to determine optimal values for $\lambda$, $E_0$, and $E_1$. For a very short QW modulator 240, the peak-to-peak phase shift can, for example, be smaller than 50 degrees. The data shown in FIG. 4B indicate that, to obtain a relatively low insertion loss in this situation, QW modulator 240 needs to operate at a relatively large extinction ratio.

Referring back to FIG. 4A, at step 404, bias voltages are selected for and applied to phase shifters 230 so that there is a phase shift of about 180 degrees between interferometer arms 214a and 214b.

At step 406, laser 110 applies optical input signal 112 (having the operating wavelength selected at step 402) to waveguide 202a of modulator 200.

At step 408, drive signals corresponding to data signals Data and $\overline{Data}$ are applied to QW modulators 240a-b, respectively. These drive signals have the drive voltages selected at step 402. As already indicated above, the data signals can have a relatively high bit rate, e.g., greater than about 80 Gb/s.

At optional step 410, the drive signals applied to QW modulators 240a-b are subjected to electrical low-pass filtering with a bandwidth corresponding to about one quarter of the bit rate. Said filtering can be performed, e.g., using filters 130a-b.

At optional step 412, optical output signal 122 is subjected to optical bandpass filtering with a bandwidth corresponding to about one half of the bit rate. Said filtering can be performed, e.g., using filter 140.

Briefly referring again to FIG. 4B, point Q in that figure indicates an exemplary configuration for transmitter 100 obtained using method 400. The length of QW modulator 240 corresponding to point Q is 115 µm. When transmitter 100 employing this particular embodiment of modulator 200 was configured to operate using the drive voltages and the operating wavelength corresponding to the values of insertion loss L and peak-to-peak phase shift indicated by point Q, the transmitter was able to produce a low-chirp optical duobinary signal having a bit rate greater than about 85 Gb/s.

While this invention has been described with reference to illustrative embodiments, this description is not intended to be construed in a limiting sense. Although a particular set of materials is specified above for QW modulators 240, other materials can also be used. For example, the MQW structure of core 260 can be implemented using a subset of the following materials: In, P, Ga, As, and Al. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. A method of operating an optical transmitter, comprising:
    (A) generating different first and second drive voltages for a first quantum-well (QW) modulator to produce an optical signal modulated with data, wherein:
        the optical transmitter comprises the first QW modulator;
        the first drive voltage corresponds to a first binary level; and
        the second drive voltage corresponds to a second binary level; and (B) generating an input optical signal having an operating wavelength for the optical transmitter such that, for the first QW modulator, a ratio δ of a peak-to-peak change in electro-refraction to a peak-to-peak change in electro-absorption corresponding to the first and second drive voltages is greater than zero but smaller than about two.

2. The method of claim 1, further comprising receiving instructions specifying a new operating wavelength, wherein:
step (B) comprises generating the optical input signal having the new operating wavelength; and
step (A) comprises:
(A1) limiting each of the first and second drive voltages to a specified voltage range; and
(A2) selecting the first and second drive voltages from the specified voltage range based on a bandgap of the first QW modulator.

3. The method of claim 1, wherein:
the data has a bit rate; and
for an optical wave having the operating wavelength, transit time through the QW modulator is smaller than about 20% of the inverse of the bit rate.

4. The method of claim 3, wherein the bit rate is greater than about 50 Gb/s.

5. The method of claim 1, wherein, for the first QW modulator, a peak-to-peak phase shift corresponding to the first and second drive voltages is smaller than 180 degrees.

6. The method of claim 5, wherein the peak-to-peak phase shift is smaller than about 90 degrees.

7. The method of claim 1, further comprising adjusting at least one of (i) the first and second drive voltages and (ii) the operating wavelength to change the ratio δ.

8. The method of claim 1, wherein the optical transmitter comprises:
a Mach-Zehnder (MZ) interferometer having first and second interferometer arms, wherein:
the first QW modulator is located in the first interferometer arm;
a second QW modulator is located in the second interferometer arm; and
at least one of the interferometer arms comprises one or more phase shifters; and
a laser optically coupled to the MZ interferometer to apply thereto the optical input signal having the operating wavelength.

9. The method of claim 8, further comprising:
applying a first drive signal having the first and second drive voltages to the first QW modulator, wherein the first drive signal is based on a first data signal; and
applying a second drive signal having the first and second drive voltages to the second QW modulator, wherein the second drive signal is based on a second data signal.

10. The method of claim 9, further comprising inverting the first data signal to generate the second data signal.

11. The method of claim 9, further comprising subjecting at least one of the first and second drive signals to low-pass filtering.

12. The method of claim 9, further comprising subjecting an optical output signal produced by the MZ interferometer to optical bandpass filtering.

13. The method of claim 9, wherein the optical transmitter generates an optical duobinary signal stream having the operating wavelength.

14. The method of claim 8, further comprising configuring the one or more phase shifters to produce a phase difference from a range between about 165 and about 195 degrees between the first and second interferometer arms.

15. An apparatus, comprising:
a Mach-Zehnder (MZ) interferometer having first and second interferometer arms, wherein:
the first interferometer arm comprises a first quantum-well (QW) modulator; and
the second interferometer arm comprises a second QW modulator;
a first driver circuit electrically coupled to drive the first QW modulator;
a second driver circuit electrically coupled to drive the second QW modulator, wherein the MZ interferometer is configured to be optically coupled to a laser to receive therefrom an optical input signal having an operating wavelength; and
a controller configured to cause:
the first driver circuit to generate first and second drive voltages for the first QW modulator; and
the second driver circuit to generate the first and second drive voltages for the second QW modulator, wherein:
the first drive voltage corresponds to a first binary level; and
the second drive voltage corresponds to a second binary level; and
wherein the first and second QW modulators are configured to cause a ratio δ of a peak-to-peak change in electro-refraction to a peak-to-peak change in electro-absorption corresponding to the first and second drive voltages to be greater than zero but smaller than about two.

16. The apparatus of claim 15, wherein the controller is configured to:
receive instructions specifying the operating wavelength; and
select the first and second drive voltages corresponding to the operating wavelength to cause the ratio δ to be greater than zero but smaller than about two.

17. The apparatus of claim 15, wherein at least one of the first and second QW modulators comprises:
a waveguide having interleaved N QW layers and N+1 barrier layers, where N is a positive integer; and
an electrode in electrical contact with the waveguide and configured to receive a drive signal having the first and second drive voltages.

18. The apparatus of claim 15, wherein:
the driver circuits are configured to drive the QW modulators based on a data stream; and
for an optical wave having the operating wavelength, transit time through at least one of the first and second QW modulators is smaller than about 20% of the inverse of a bit rate of said data stream.

19. The apparatus of claim 15, wherein at least one of the first and second QW modulators has a total length smaller than about 500 μm.

20. The apparatus of claim 15, wherein:
the first and second interferometer arms comprise one or more phase shifters; and
the controller is configured to cause the one or more phase shifters to produce a phase difference from a range between about 165 and about 195 degrees between the first and second interferometer arms.

21. The apparatus of claim 15, comprising an optical transmitter, wherein the MZ interferometer, the first driver circuit, and the second driver circuit are parts of said optical transmitter.

22. The apparatus of claim 15, further comprising the laser, wherein the controller is configured to cause the laser to generate the operating wavelength.

23. The apparatus of claim 15, further comprising a set of one or more electrical filters configured to subject at least one of the first and second drive signals to low-pass filtering.

24. The apparatus of claim 15, further comprising an optical filter configured to subject an optical output of the MZ interferometer to optical bandpass filtering to generate an optical duobinary signal having the operating wavelength.

* * * * *